Aug. 8, 1961  C. H. CLARRIDGE  2,995,706
LOGARITHMIC SCALE METER
Filed Dec. 11, 1957

INVENTOR
CHESTER H. CLARRIDGE
BY
Francis E. Blake
ATTORNEY

United States Patent Office 2,995,706
Patented Aug. 8, 1961

2,995,706
LOGARITHMIC SCALE METER
Chester H. Clarridge, Pittsford, N.Y., assignor to General Dynamics Corporation, Rochester, N.Y., a corporation of Delaware
Filed Dec. 11, 1957, Ser. No. 702,118
4 Claims. (Cl. 324—78)

This invention relates to electrical metering means and particularly to means for measuring and displaying the count of the average number of discrete phenomena occurring per unit of time.

The object of the invention is to provide metering means which will accurately indicate values over an extraordinarily wide range. This may be done by a meter provided with a logarithmic scale if the input thereto can be made to conform to a logarithmic characteristic over a sufficiently wide range.

The invention resides in the combination of two conventional circuit means, (1) a circuit popularly known as a dump and fill or as a dipper and bucket circuit for producing a potential equal to the average count of increments of power entered therein per unit of time, and (2) a circuit which will give a direct current output voltage proportional to the logarithm of the input voltage. The dipper and bucket circuit is used to count the average number of events occurring in each time unit and the logarithmic indicator is used to display the result. However, the matter is not as simple as it would thus appear when a great range is to be covered. Applicant has discovered that neither the dipper and bucket circuit nor the so-called logarithmic voltage divider circuit has a linear characteristic over a sufficiently wide range.

Where, by way of example, a device is to be used as a neutron counter, the number to be counted may occur in a first decade (1 to 10) or in a fifth decade (10,000 to 100,000) or even far beyond that.

Logarithmic voltage divider circuits conventionally appear to be accurate over three decades but beyond that the characteristic appears to deviate in what may be termed a rising scale, that is whereas the relationship between input potential and output potential appears to be a linear characteristic on a logarithmic scale a deviation occurs beyond an ordinarily conventional range and the output potential rises faster than has been expected.

Applicant has further discovered that the conventional dipper and bucket circuit likewise appears to have a characteristic which deviates from linearity as the frequency or average periodicity is increased, it appearing that the total charge or the amount stored lags behind the input, or alternatively that the increments decrease in value as the frequency increases.

In accordance with the present invention, applicant has discovered that by matching these two deviations, one against the other, he can produce a linear logarithmic indication far beyond any capability heretofore attained whereby metering means accurate over at least five decades is possible.

The device of the present invention consists substantially of a meter operated from a probe which may be applied to a circuit responsive to discrete and random occurrences which may appear at various rates or densities over an extremely great range, such as the emission of neutrons at a rate of an occasional one to a dense stream thereof counted in the millions. In order to indicate numbers in such a wide range the meter must be calibrated over a logarithmic scale, that is, equal divisions thereof representing numbers $10^0$, $10^1$, $10^2$, $10^3$, and so on and intermediate divisions being arranged as on the face of the ubiquitous slide rule, the said equally spaced divisions being spoken of as decades. The device then consists of several parts, the first of which is a means for translating each discrete occurrence into what may be termed a definite and uniform quantity of power, and which delivered to a reservoir may establish a corresponding level measured in potential which will be an indication of the rate of such discrete occurrences. This is the conventional dipper and bucket circuit, but is modified by a second part of the device by which the rate at which the dippered quantities are ladled into the bucket is reduced logarithmically so that the rise in potential reaches a given level when the ladled quantities are supplied at the rate of ten per unit of time, it will only reach twice that level when at the rate of one hundred per unit of time, thrice that level when at the rate of one thousand per unit of time and so on.

Applicant is aware of the fact that the prior art shows such a logarithmic circuit means built about the characteristics of certain crystal diodes or junction rectifiers and reference is made as an example thereof to an article entitled "The Application of Some Semiconductors as Logarithmic Elements," by N. M. Schaeffer and G. W. Wood, published in the Proceedings of the IRE, July 1954, pages 113–116. Such prior art devices, however, have definite limitations for the diode characteristics over the range which applicant strives to cover deviate markedly from a straight line. Applicant has discovered that he may devise a translating means having a complementary characteristic, that is, one which deviates from linearity but in the reverse direction so that by using this translating means in combination with the known and heretofore limited diode means he may provide an indicating device having a linear characteristic far beyond anything heretofore possible.

A feature of the invention is a bucket and dipper circuit consisting generally of an electrical condenser having in shunt therewith a bleeder circuit and having as an input thereto a circuit through a diode of established characteristics, the said bleeder circuit in turn consisting of a resistor in series with a diode of like characteristics, the said resistor and diode constituting a voltage divider circuit, the voltage about the said diode being the logarithm of the voltage about the bleeder circuit as a whole.

Another feature of the invention is a monostable multivibrator used as a means for translating discrete phenomena into uniform increments of power. Since the discrete phenomena may not be of uniform magnitude it is desirable, in order to accurately operate a bucket and dipper circuit to translate each phenomenon into a uniform output manifestation. Thus a monostable multivibrator, which will respond to the triggering effect of the incoming pulses of a stream even though such incoming pulses are not of uniform magnitude, will produce an output of uniform magnitude pulses or increments of power.

Since the monostable multivibrator feeds directly into the bucket and dipper circuit and since such circuit contributes to the lagging characteristic of the bucket and dipper arrangement, the two should be considered as a unit whose output produces a unique output which is substantially complementary to the characteristic of the diode in the logarithmic voltage divider circuit whereby a substantially linear output characteristic may be produced.

A feature of the invention may therefore be stated as the combination of a bucket and dipper circuit and a multivibrator circuit for translating non uniform incoming pulses into a stream of substantially uniform increments of power in which the combination output has a lagging characteristic in its high saturation range.

The drawings consist of a single sheet having four figures, as follows.

Figure 2:
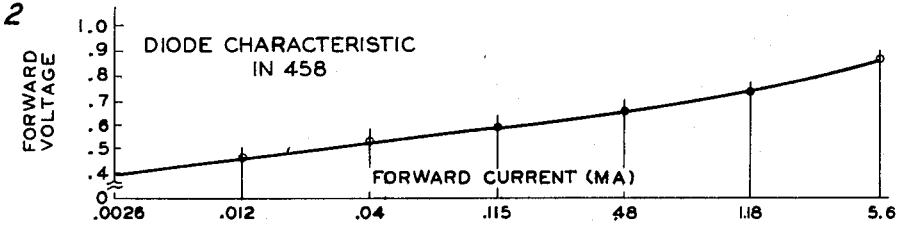
FIG. 2 is a graph showing the relation between the forward voltage and the forward current of a diode comprising the logarithmic element of the bleeder circuit.
Figure 3:
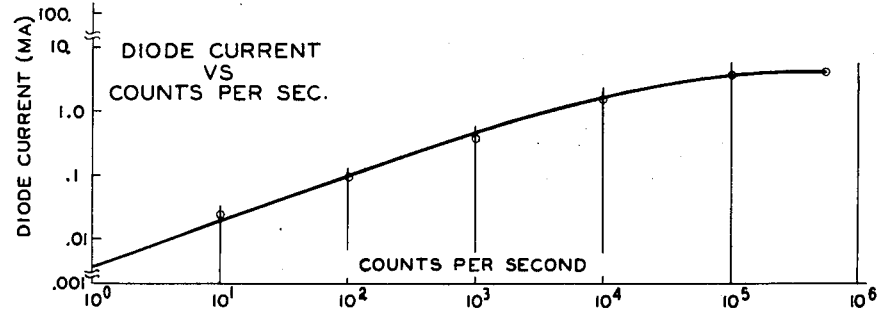
Figure 4:
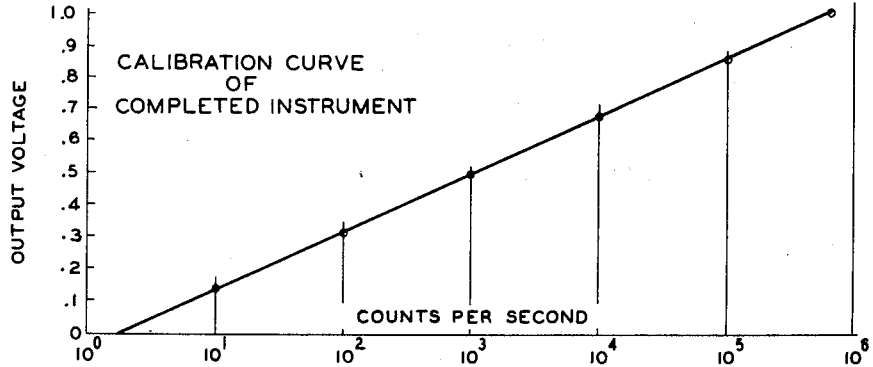

FIG. 3 is a similar graph showing the characteristic relation between diode current and the number of counts per second; and FIG. 4 is a calibration curve of the completed device, the three characteristic curves of FIGS. 2, 3 and 4 being expressed on the same counts per second basis whereby the rising characteristic of FIG. 2 may be compared to the falling characteristic of FIG. 3 to indicate the manner in which the linear characteristic of FIG. 4 is obtained.

Figure 1:
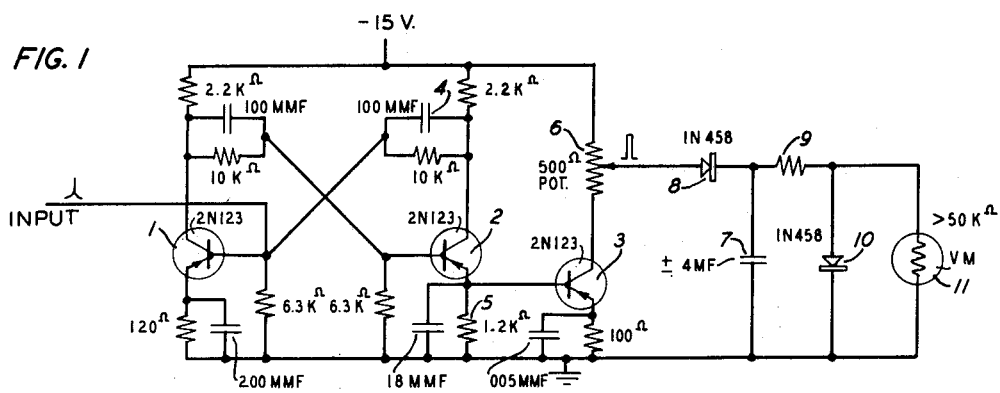
FIG. 1 is a schematic circuit diagram showing the combination of a monostable multivibrator, a bucket and dipper circuit, a bleeder circuit having a logarithmic section and a voltmeter for indicating the potential developed in said logarithmic section.

In FIG. 1, the left hand portion of the circuitry is a schematic representation of a monostable multivibrator, constructed principally of three 2N123, commercially available transistors. Certain values are shown alongside the various components, it being understood that these are by way of example and are capable of wide variation as the device shown is adapted for various uses.

Again, and by way of example, the device of the present invention may be used with scintillation counters which put out pulses of varying height and width depending on the type of incident radiation. The scintillation counter pulses are small negative pulses of about a millivolt to a volt in height, the width varying from a few tenths of a microsecond to about one and a half microseconds, depending on the height of the pulse. The rise time of the pulse is exponential and fast, better than one tenth microsecond. The fall time is exponential and much slower, comprising the remainder of the above mentioned width.

These small negative pulses are amplified before they are used as a trigger for the multivibrator. The last stage of amplification is a saturating stage, 10 millivolts to the input to the first stage being sufficient to saturate the final stage. The square topped positive pulse is then differentiated and the negative portion clipped. This results in a fairly standard trigger pulse for the multivibrator which completes the pulse shaping.

The multivibrator will trigger on any pulse of 2 volts or better. This trigger level in conjunction with a gain control in the amplifier results in a convenient pulse discriminator, that is, the amplifier gain can be set so that only pulses of greater than a certain value will be counted.

The trigger pulse width is about 1 microsecond. The widest pulse out of the scintillation counter appears to be about 1.5 microseconds so that this limits the pulse frequency that will be resolved.

The pulse out of the multivibrator should be as wide as possible so that more signal is available on the bucket capacitor for the low count rates, yet the pulse should not be so wide that it restricts the maximum frequency determined by the resolving time of the scintillation counter. A pulse width of 1.2 microseconds appears to be a practical and workable value, for pulses of this width actually limit accurate counting to about 100 k.c. whereby the limiting value in the curves of FIGS. 3 and 4 is reached somewhere in the decade $10^5$–$10^6$.

The above description and data is given by way of example to show one source from which random pulses representing phenomena to be counted may be derived and which may be transmitted into the circuit of FIG. 1. The operation of the multivibrator is as follows.

The first stage is normally "on," that is, there is an operative current flow through the collector of transistor 1 whereby the bias on the base of transistor 2 is held sufficiently positive to hold this transistor 2 "off." Transistor 3 is a common emitter saturating amplifier which shapes the outpulse of the multivibrator, allowing higher frequency of operation, more loading and less temperature dependency.

A positive trigger pulse on the base of transistor 1 cuts it "off" whereby its collector is driven negative in turn driving the base of transistor 2 negative and driving it "on." This drives the collector of transistor 2 positive, reinforcing the "off" condition of transistor 1. This process is regenerative until the transistor 1 is fully "off" and transistor 2 is fully "on." At this time the capacitor 4 (sometimes called the timing capacitor) starts discharging. When the voltage on the base of transistor 1 is discharged to a value just negative of the emitter, transistor 1 starts to turn "on," a regenerative action taking place that rapidly turns transistor 1 "on" and transistor 2 "off," completing the cycle.

The resistor 5, in the emitter of the transistor 2, is large enough so that the emitter is negative with respect to the base under quiescent conditions. When transistor 2 goes "on" a negative pulse is developed across resistor 5 and since this negative pulse is directly coupled to the base of transistor 3 and is large enough (about 3.5 volts) to drive the amplifier into saturation. By using a potentiometer 6 as a load resistor, pulses of any height between 0 and 15 volts may be seen at the output. These are the pulses that are fed to the "bucket" capacitor 7.

In the operation of the device the trigger pulses derived from any source, either a scintillation counter as described by way of example, or any other source, are fed into the input leading to the base of transistor 1 and the output pulses of more uniform shape and duration are led out through a unidirectional diode 8 to the bucket condenser 7. As in all bucket and dipper arrangements a bleeder circuit is provided, consisting here of a resistor 9 and a silicon junction diode 10. It is known that the potential established over the diode portion of this voltage divider circuit is proportional to the logarithm of the potential across the whole. By means of a high impedance voltmeter 11, provided with a logarithmic scale, the average count of the number of pulses ladled into the bucket may be displayed.

It has furthermore been found that the diode characteristic has an increasing deviation from linearity as its forward current is increased so that without some compensation the reading of the voltmeter in the upper part of its scale representing counts of $10^4$ and greater would be exaggerated.

It has also been found that the input to the bucket condenser 7 exhibitis a similar but lagging characteristic so that one is complementary to the other with the result that remarkable linearity, as expressed in FIG. 4 may be achieved.

It is to be noted that the lagging characteristic of the multivibrator circuit is due greatly to crowding or overlapping output pulses and this may occur at frequencies less than that at which a succession of output pulses would tend to become a continuous potential value, due to the extremely random nature of the input particularly that which may be derived from a scintillation counter.

The device of the present invention therefore provides a means for displaying the average count of randomly occurring phenomena over a range far beyond that achieved by any prior art arrangement.

What is claimed is:

1. Means for displaying the average count of discrete phenomena per given time period consisting of means for translating each phenomenon into an electrical pulse, a tank condenser for receiving said pulses and a bleeder circuit for said condenser, said condenser and bleeder circuit having a characteristic expressed on a logarithmic chart linear for most of its length but deviating decreasingly on increasing counts, and a logarithmic voltage divider for said bleeder circuit, said logarithmic portion of said bleeder circuit having a characteristic expressed on a logarithmic chart linear for most of its length but deviating increasingly on increasing counts, said two characteristics being complementary to produce an overall combined linear characteristic.

2. An input circuit for a voltmeter provided with a multidecade logarithmic scale consisting of the combination of a tank condenser having a generally linear characteristic over the greater part of its range and a decreasing deviation thereafter and a bleeder resistor consisting of a logarithmic voltage divider circuit including a silicon junction rectifier having a generally linear characteristic over the greater part of its range and an increasing deviation thereafter, whereby the output of said combination has a generally linear characteristic throughout its range.

3. Means for displaying the average count of discrete phenomena per given time period consisting of means for translating each phenomenon into a uniform quantity, a storage circuit consisting of means to receive and store said quantities transmitted thereinto by said translating means, a bleeder circuit therefor, said storage circuit being constructed and arranged to produce a potential level proportional to the average said count of phenomena and having a characteristic lagging from linearity in the higher count region thereof, said bleeder circuit consisting of a logarithmic voltage divider circuit connected about said storage circuit and having a characteristic complementary to said characteristic of said storage circuit and a voltmeter connected to and responsive to said logarithmic section of said voltage divider circuit.

4. Means for displaying the average count of randomly occurring discrete phenomena per given time period consisting of a monostable multivibrator and a bucket and dipper circuit connected to the output thereof, said monostable multivibrator having a lagging characteristic in the region where the output pulses become so numerous that they become crowded, said bucket and dipper circuit including a bleeder circuit consisting of a series resistor and a silicon junction diode, said diode having a rising characteristic corresponding to and complementary to said lagging characteristic, and a voltmeter connected in parallel to said diode.

References Cited in the file of this patent

UNITED STATES PATENTS

| 2,284,423 | Hansell | May 26, 1942 |
| 2,552,854 | Jacobs | May 15, 1951 |

FOREIGN PATENTS

| 762,369 | Great Britain | Nov. 28, 1956 |